Dec. 19, 1944.  T. R. GILCHRIST ET AL  2,365,406
RAILWAY TRUCK
Filed May 25, 1942  2 Sheets-Sheet 1
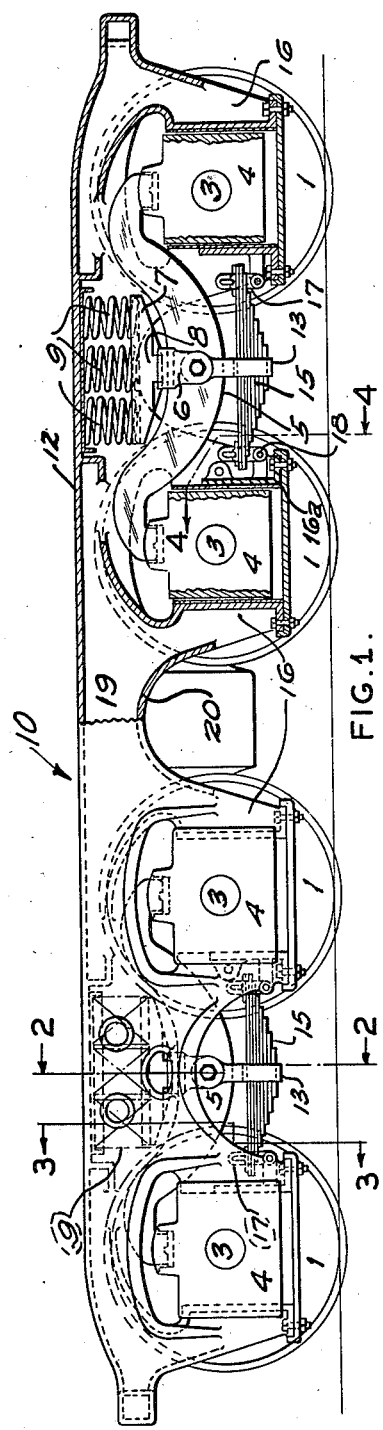
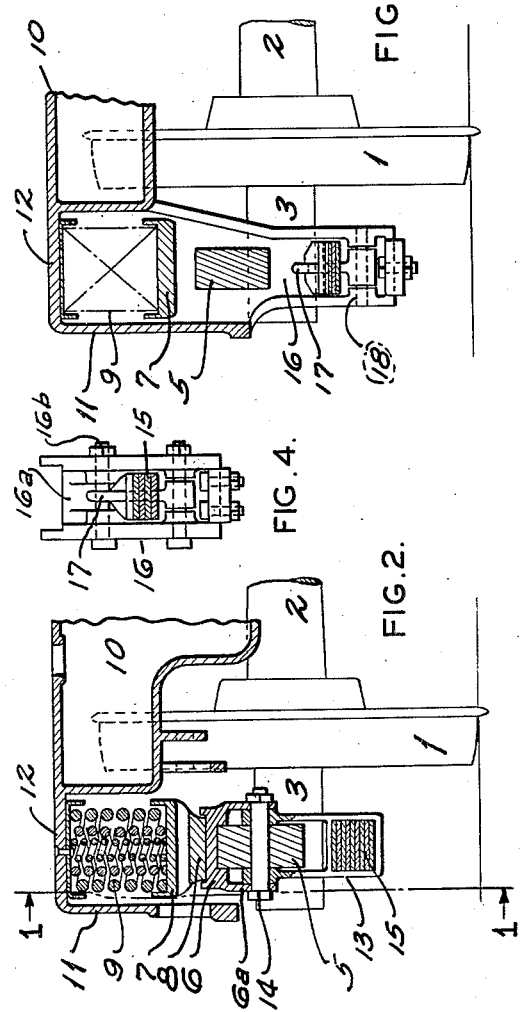
INVENTORS
THOMAS R. GILCHRIST
WILLIAM E. BURDICK
By Rodney Bedell
ATTORNEY Dec. 19, 1944. T. R. GILCHRIST ET AL 2,365,406
RAILWAY TRUCK
Filed May 25, 1942 2 Sheets-Sheet 2
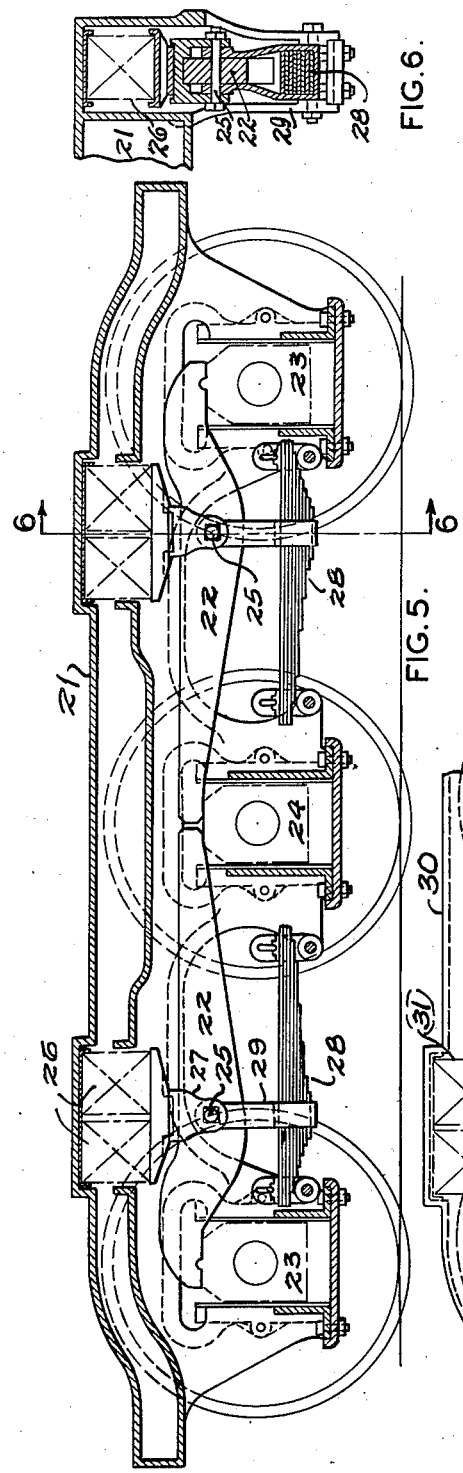
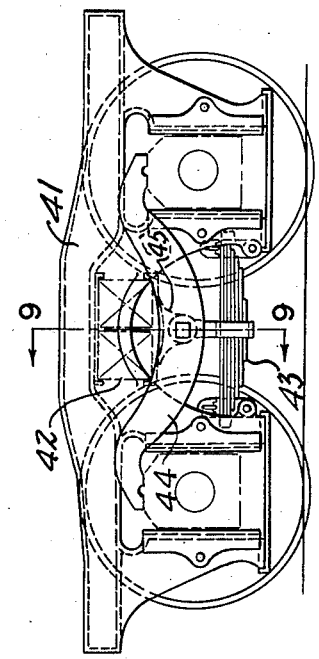
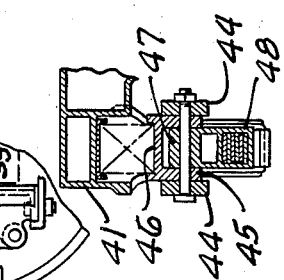
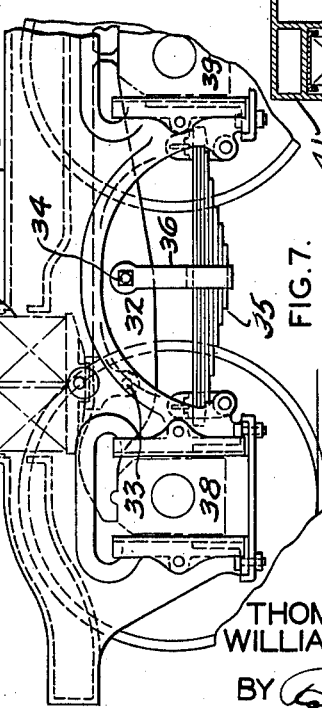
INVENTORS
THOMAS R. GILCHRIST
WILLIAM E. BURDICK
BY *Rodney Bedell*
ATTORNEY Patented Dec. 19, 1944

2,365,406

UNITED STATES PATENT OFFICE 2,365,406

RAILWAY TRUCK

Thomas R. Gilchrist, Yeadon, and William E. Burdick, Springfield, Pa., assignors to General Steel Castings Corporation, Granite City, Ill., a corporation of Delaware Application May 25, 1942, Serial No. 444,330

9 Claims. (Cl. 105—183)

The invention relates to railway rolling stock and more particularly to the spring support of a frame member from the axle journal boxes. The invention is particularly adapted for use in truck structure but may be associated with wheeled axles mounted directly in a vehicle underframe.

The main object of the invention is to provide adequate spring capacity in a restricted space and more particularly to provide for relatively large spring capacity in an equalized truck having a short wheel base.

Another object of the invention is to distribute the points of application of the springs to the supported frame and thereby avoid concentration of loads.

Another object of the invention is to reduce or eliminate frequent spring oscillations and thereby avoid undue bouncing due to synchronization of vibrations.

These and other detailed objects of the invention as will appear below are attained by the structure illustrated in the accompanying drawings in which—

Figure 1 is in part a side elevation and in part a longitudinal vertical section through an eight-wheel truck upon which one end of the body of a vehicle may be mounted. The section portion of the figure is taken approximately on the line 1—1 of Figure 2.

Figures 2, 3 and 4 are detailed vertical transverse sections taken on the corresponding section lines of Figure 1.

Figure 5 corresponds generally to Figure 1 but illustrates another arrangement of the springs and equalizers as applied to a six-wheel truck.

Figure 6 is a vertical transverse section on the line 6—6 of Figure 5.

Figure 7 is a side view illustrating another arrangement of the springs and equalizers of a six-wheel truck.

Figure 8 is a similar view illustrating the application of the invention to a four-wheel truck.

Figure 9 is a vertical transverse section taken on the line 9—9 of Figure 8.

The truck includes the usual wheels 1, axles 2 with journals 3 upon which are mounted journal boxes 4, all of familiar construction. The journal box at each end of the truck supports one end of an equalizer bar 5 and the other end of the bar is supported by the adjacent journal box at the same side of the truck.

A saddle 6 is mounted upon the intermediate portion of each equalizer 5. A spring seat 7 extends in opposite directions from an intermediate lower portion 8 carried on saddle 6 and mounts spring structure here shown as a series of three units 9 of coil springs disposed one after the other longitudinally of the truck. A truck frame 10 includes a wheel piece having an inverted U-section 11 intermediate the journal boxes and receiving springs 9 with the upper wall 12 of the section resting upon these springs.

A yoke 13 is pivotally suspended from equalizer 5 by a bolt 14 and encircles and supports a leaf spring 15 extending longitudinally of the truck but terminating short of the adjacent journal boxes 4. Bolt 14 also extends through and anchors dependent arms 6a on saddle 6.

The truck frame includes pedestal legs 16 depending from the wheel pieces below equalizers 5 and alongside of journal boxes 4. Links 17 are suspended from the ends of spring 15 and are pivotally connected by pins 18 to the lower portions of the adjacent pedestal legs 16. The pedestal leg at one end of each spring 15 is provided with a section 16a detachably secured to the remainder of the pedestal leg by bolt 16b and being removable to permit raising and lowering of one end of the equalizer bar up to and down from the assembled position shown, the other end of the equalizer bar being inserted endwise into the assembled position shown, it being understood that such movement into and out of assembled position is effected with the journal boxes removed. This feature is described in detail in H. M. Pflager Patent No. 1,584,133, issued May 11, 1926.

The inverted U-section of the wheel pieces provides for the reception of springs 9 and the upper portions of equalizer bars 5, thereby providing adequate space for the leaf spring below the equalizer bar. The intermediate portion 19 of the wheel piece between the center axles 2 is of box section for greater strength, the bottom wall 20 of the section inclining downwardly to form portions of the adjacent pedestal legs 16.

With the construction illustrated and described, part of the load is carried on the coil spring structure and part on the leaf spring structure. This makes it possible to increase the spring capacity without elongating the series of coil springs, as has been done previously. Accordingly the adjacent axles may be located close together, which feature is particularly advantageous in an eight-wheel truck as it makes for a short overall wheel base for the truck, facilitating the movement of the vehicle on curved track.

The support for each group of springs in each four-wheel unit is restricted to the middle portion of the associated truck equalizer but the springs of each group support the truck frame at points spaced apart lengthwise of the truck frame. The leaf spring structure tends to snub the coil spring and this feature, together with the distribution of the load to the two-spring structures, permits each individual coil spring unit and leaf spring unit to be of a less capacity than if it received the entire load and assures that the spring action would be softer and that the truck would have better riding qualities.

While the invention is illustrated as being embodied in an eight-wheel truck, it will be understood that it may be used in a six-wheel truck or a four-wheel truck by varying the arrangement of the springs and the support of the truck frame.

Figures 5 and 6 illustrate one arrangement of the invention applied to a six-wheel truck in which the load carried centrally of the truck frame 21 is equalized to the three axles by equalizers 22, the outer end of each equalizer being supported upon an individual end journal box 23 and the inner end of both equalizers at the same side of the truck being supported by the middle journal box 24.

Each coil spring unit 26 is mounted upon the corresponding equalizer 22 by a seat 27 in the manner previously described but fewer coil springs are required in the unit because of the smaller load for which the truck is designed. A bolt 25 secures each seat 27 in place on its equalizer, and a yoke 29 suspended from each bolt 25 supports a leaf spring 28 corresponding generally to the leaf springs previously described. Seat 27, bolt 25 and yoke 29 are positioned approximately one-third of the distance from the outer journal box to the middle journal box, thereby making the outer arm of each equalizer one-half the length of the inner arm, and the arms of the leaf spring are similarly proportioned, thereby distributing two-thirds of the load carried by each spring group to the outer journal box and one-third of the load to the inner journal box and thus equalizing the total load on the frame to all three axles.

Figure 7 illustrates another arrangement of the invention applied to the frame 30 of a six-wheel truck, only a half of one side of the truck being illustrated, but in this arrangement the coil spring unit 31 is supported on the equalizer 32 at a point 33 spaced longitudinally of the equalizer from the point of support 34 of the yoke 36 carrying the leaf spring unit. Yoke 36 is suspended midway between end journal box 38 and middle journal box 39, and the leaf spring 35 has equal arms. In order to provide equal distribution of the load to the two journal boxes, the point of support 33 of the coil spring unit is moved closer to end journal box 38 than in the arrangement illustrated in Figure 5.

Figures 8 and 9 illustrate the application of the invention to a four-wheel truck. The truck frame 41 is supported at each side of the truck by a single coil spring unit 42 and a single leaf spring unit 43, both spring units being carried by double equalizer bars 44 straddling the adjacent portions of the truck frame wheel piece 41. With the use of double equalizers, the truck frame wheel piece can be made of box section throughout its length, and this tends to provide a lighter wheel piece structure. The depending portions 45 of the seat 46 for the coil springs are received between equalizer bars 44, and the upper end 47 of yoke 48 supporting the leaf spring unit is received between seat portions 45.

Except for this detail and the use of a coil spring unit of less length, the construction and operation of the structure shown in Figures 8 and 9 are substantially like that of one of the four-wheel units shown in Figure 1.

It will be understood that a single equalizer received between spaced portions of the coil spring seat and the leaf spring yoke, as shown in Figures 2 and 6, could be substituted for the double equalizer bar arrangement shown in Figure 9, and it will also be understood that the double bar arrangement of Figure 9 could be substituted for the single equalizer bar arrangement shown in Figures 2 and 6.

These and other variations in the details of the structure may be made without departing from the spirit of the invention, and the exclusive use of such modifications as come within the scope of the claims is contemplated.

What is claimed is:

1. In a railway truck, spaced wheeled axles with journal boxes, a truck frame including a wheel piece extending over said journal boxes and having an inverted U-shaped cross section between said boxes and having depending pedestal legs at the sides of said boxes, and means supporting said frame on said boxes comprising an equalizer extending between and resting on said boxes, helical spring structure carried by said equalizer intermediate its ends and housed in said wheel piece and seated against the upper wall thereof to support the frame, and leaf spring structure with its center supported from said equalizer and with its ends having supporting engagement with said pedestal legs.

2. In a railway truck, spaced wheeled axles with journal boxes, a load carrying frame including a wheel piece extending over said journal boxes and having an inverted U-shaped cross section between said boxes, an equalizer with its ends resting on said journal boxes and projecting upwardly into the space between the sides of said wheel piece, the intermediate portion of said equalizer being lower than the end portions, a saddle mounted on said intermediate portion of said equalizer, spring structure carried by said saddle and extending upwardly therefrom between the sides of said wheel piece and seated against the upper wall of said wheel piece to support the same, a leaf spring extending longitudinally of the truck beneath said equalizer with its intermediate portion supported from the intermediate portion of said equalizer with its end portions supporting parts of said frame depending from said wheel piece alongside of and below said equalizer.

3. In a railway six-wheel truck, three spaced axles with journal boxes, an equalizer extending between and resting on each end box at each side of the truck and on the middle box at that side of the truck, a load carrying frame having a part extending downwardly below each equalizer adjacent each of said boxes, a leaf spring below each equalizer with its ends supporting the adjacent downward extending frame parts, and a device supporting each spring from the associated equalizer at points on the spring and equalizer nearer to the end box than to the middle box, whereby the load on the frame is equally distributed to all three axles.

4. In a railway six-wheel truck, three spaced axles with journal boxes, an equalizer extending between and resting on each end box at each side of the truck and on the middle box at that side of the truck, a load carrying frame having a downwardly extending part projecting below each equalizer adjacent to each of said boxes, a leaf spring below each equalizer with its ends supporting the adjacent downwardly extending frame parts, a device suspended from each equalizer midway of its points of support on the journal boxes and supporting the associated leaf spring midway of its points of support of said frame parts to distribute the spring load equally to the end and middle journal boxes, and a frame supporting spring above each equalizer and supported on the latter at a point nearer the associated end journal box than the middle journal box, whereby a greater portion of the frame load carried by each of the latter-mentioned springs is distributed to the corresponding end journal box to compensate for the equal distribution of load to adjacent journal boxes by the corresponding leaf spring and thereby effect equal loading of all three axles.

5. In a railway vehicle, spaced wheeled axles with journal boxes, an equalizer extending between and over journal boxes at the same side of the truck and supported thereon, a load carrying frame including a wheel piece extending longitudinally of the truck over the equalizer, and two spring units forming the sole support of said frame on the equalizer, one spring unit being beneath the equalizer and suspended between its ends from the equalizer and having supporting connections to said frame at points substantially spaced apart longitudinally of the truck, and the other spring unit being above said equalizer and having a seat on said equalizer positioned longitudinally of the truck between said points and having a support for said wheel piece positioned longitudinally of the truck between said points.

6. In a railway vehicle, spaced axles with journal boxes, an equalizer extending between and supported on said journal boxes, spring structure above said equalizer and supported therefrom at a point between said boxes, spring structure beneath said equalizer and supported therefrom at a point substantially in vertical alignment with the point of support of said first-mentioned spring structure, and a load-carrying frame including a longitudinal wheel piece extending over said equalizer and both of said spring structures, and supported on the latter and provided with pedestals receiving the journal boxes and transmitting thrusts between the frame and the boxes longitudinally and transversely of the truck, the first-mentioned spring structure supporting said frame over said points and the second-mentioned spring structure supporting said frame at said pedestals.

7. In a railway vehicle, spaced axles with journal boxes, an equalizer extending between and supported on said journal boxes, spring structure above said equalizer and supported therefrom at a point between said boxes, spring structure beneath said equalizer and supported therefrom at a point substantially in vertical alignment with the point of support of said first-mentioned spring structure, and a load-carrying frame supported on said spring structures and including a side member comprising upright walls spaced apart transversely of the truck and receiving between them portions of said spring structures and equalizer and including pedestals receiving the journal boxes and transmitting thrusts between the frame and the boxes longitudinally and transversely of the truck.

8. In a railway truck, spaced wheeled axles with journal boxes, a truck frame including a wheel piece extending over said journal boxes and having an inverted U-shaped cross section between said boxes and having depending pedestal legs at the sides of said boxes, and means supporting said frame on said boxes comprising an equalizer extending between and resting on said boxes, spring structure carried by said equalizer between its ends and housed in said wheel piece and seated against the upper wall thereof to support the frame, and spring structure extending between and supported by pedestal legs of adjacent boxes and between said legs supported from said equalizer.

9. In a railway vehicle, spaced axles with journal boxes, an equalizer extending between and supported on said journal boxes, a helical coil spring above said equalizer and supported therefrom at a point between said boxes, a leaf spring beneath said equalizer and supported therefrom at a point substantially in vertical alignment with the point of support of said first-mentioned spring, and a load carrying frame supported on said springs and provided with pedestals receiving the journal boxes and transmitting thrusts between the frame and boxes longitudinally and transversely of the truck.

THOMAS R. GILCHRIST.
WILLIAM E. BURDICK.